United States Patent
Huang et al.

(10) Patent No.: US 8,966,632 B1
(45) Date of Patent: Feb. 24, 2015

(54) IN-THE-CLOUD SANDBOX FOR INSPECTING MOBILE APPLICATIONS FOR MALICIOUS CONTENT

(75) Inventors: Huaide Huang, Taipei (TW); Shun-Fa Yang, Taipei (TW); Chung-Tsai Su, Xindian (TW); Geng Hwang Twu, Banchiao (TW); Haoping Liu, Changhua (TW)

(73) Assignee: Trend Micro Incorporated, Tokyo (JP)

( * ) Notice: Subject to any disclaimer, the term of this patent is extended or adjusted under 35 U.S.C. 154(b) by 41 days.

(21) Appl. No.: 13/399,179

(22) Filed: Feb. 17, 2012

(51) Int. Cl.
*G06F 11/00* (2006.01)
*G06F 12/14* (2006.01)
*G06F 12/16* (2006.01)
*G06F 21/53* (2013.01)

(52) U.S. Cl.
CPC ..................................... *G06F 21/53* (2013.01)
USPC ........ 726/24; 726/1; 726/10; 726/14; 726/21; 713/183

(58) Field of Classification Search
CPC ....................................................... G06F 21/53
USPC ............................................................. 726/24
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Isamel et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |
| 6,842,897 B1 | 1/2005 | Beadle et al. | |
| 6,941,552 B1 | 9/2005 | Beadle et al. | |
| 6,976,059 B1 | 12/2005 | Rogalski et al. | |
| 7,039,691 B1 | 5/2006 | Turnidge | |
| 7,191,211 B2 | 3/2007 | Tuli | |
| 7,290,129 B2 | 10/2007 | Chebolu et al. | |
| 7,506,257 B1 | 3/2009 | Chavez et al. | |
| 7,634,811 B1 | 12/2009 | Kienzle et al. | |
| 8,024,790 B2 | 9/2011 | Zhao et al. | |
| 8,239,918 B1* | 8/2012 | Cohen | 726/1 |
| 2001/0054062 A1 | 12/2001 | Ismael et al. | |
| 2002/0129281 A1 | 9/2002 | Hatfalvi et al. | |

(Continued)

FOREIGN PATENT DOCUMENTS

WO    WO 2005066786 A1    7/2005

OTHER PUBLICATIONS

IP.com Search results.*

*Primary Examiner* — Arvin Eskandarnia
(74) *Attorney, Agent, or Firm* — Okamoto & Benedicto LLP

(57) ABSTRACT

A low resource mobile device, such as a smart phone or a tablet running a mobile operating system, requests a cloud computer system to inspect a mobile application for malicious content. The cloud computer system downloads the mobile application from a mobile application source, and installs the mobile application in a virtual machine sandbox. The cloud computer system inspects the mobile application for malicious content while the mobile application executes in the virtual machines sandbox. The result of the inspection is sent to the user in accordance with a setting that may be indicated in a cloud sandbox agent running on the mobile device.

20 Claims, 3 Drawing Sheets

(56) References Cited

U.S. PATENT DOCUMENTS

| | | |
|---|---|---|
| 2003/0041106 A1 | 2/2003 | Tuli |
| 2004/0148608 A1 | 7/2004 | Gendreau et al. |
| 2004/0158830 A1 | 8/2004 | Chung et al. |
| 2004/0230643 A1 | 11/2004 | Thibault et al. |
| 2005/0188361 A1 | 8/2005 | Cai et al. |
| 2005/0198485 A1 | 9/2005 | Nguyen et al. |
| 2005/0246176 A1 | 11/2005 | Creamer et al. |
| 2006/0112342 A1 | 5/2006 | Bantz et al. |
| 2007/0199058 A1 | 8/2007 | Baumgart et al. |
| 2011/0167474 A1* | 7/2011 | Sinha et al. ............. 726/1 |
| 2012/0005674 A1* | 1/2012 | Larimore et al. ......... 718/1 |
| 2013/0091542 A1* | 4/2013 | Cohen ....................... 726/1 |
| 2013/0097706 A1* | 4/2013 | Titonis et al. ............ 726/24 |

* cited by examiner

IN-THE-CLOUD SANDBOX FOR INSPECTING MOBILE APPLICATIONS FOR MALICIOUS CONTENT

BACKGROUND OF THE INVENTION

1. Field of the Invention

The present invention relates generally to mobile device security, and more particularly but not exclusively to methods and apparatus for inspecting mobile applications for malicious content.

2. Description of the Background Art

Mobile devices that run mobile operating systems are low resource devices in that they typically have less processing power compared to desktops and laptop computers. Nevertheless, because they are more portable, lighter, easier to use, and have more convenient form factor compared to full blown computers, mobile devices are widely popular. Examples of mobile devices include smart phones (e.g., APPLE IPHONE phone and ANDROID phones) and tablets (e.g., APPLE IPAD tablet and ANDROID tablets).

Examples of mobile operating systems for mobile devices include the ANDROID mobile operating system and the APPLE iOS mobile operating system. The use of a mobile operating system coupled with their relatively low processing power prevents mobile devices to simply use the same antivirus techniques employed in regular computers. This leaves mobile devices vulnerable to malicious content, such as computer viruses, that may be included in a mobile application. The problem is exacerbated by the ease by which a mobile application may be downloaded to a mobile device and by the proliferation of unsecure mobile application stores.

SUMMARY

In one embodiment, a method of inspecting mobile applications for malicious content includes receiving a request from a mobile device running a mobile operating system to inspect a mobile application for malicious content. The mobile application is received from a mobile application source. The mobile application is installed in a virtual machine sandbox running in a cloud computer system. The mobile application is inspected for malicious content while the mobile application is executing in the virtual machine sandbox. A result of inspecting the mobile application for malicious content is sent to the mobile device.

In another embodiment, a system for inspecting mobile applications for malicious content comprises a mobile device configured to send a request to inspect a mobile application for malicious content, the mobile device running a mobile operating system, a mobile application source storing the mobile application, and the cloud computer system configured to receive from the mobile device the request to inspect the mobile application for malicious content, the cloud computer system being configured to download the mobile application from the mobile application source over a computer network, to install the mobile application in a virtual machine sandbox, to inspect the mobile application for malicious content while the mobile application is executing in the virtual machine sandbox, and to forward to the mobile device a result of the inspection of the mobile application for malicious content.

In another embodiment, a method of inspecting mobile applications for malicious content includes a smart phone sending a request to inspect a mobile application for malicious content to a cloud computer system. In response to receiving the request to inspect the mobile application for malicious content, the cloud computer system downloads the mobile application from a mobile application source over a computer network. The cloud computer system installs the mobile application in a virtual machine sandbox. The cloud computer system inspects the mobile application for malicious content while the mobile application is executing in the virtual machine sandbox. The cloud computer system sends a result of inspecting the mobile application for malicious content to the smart phone.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
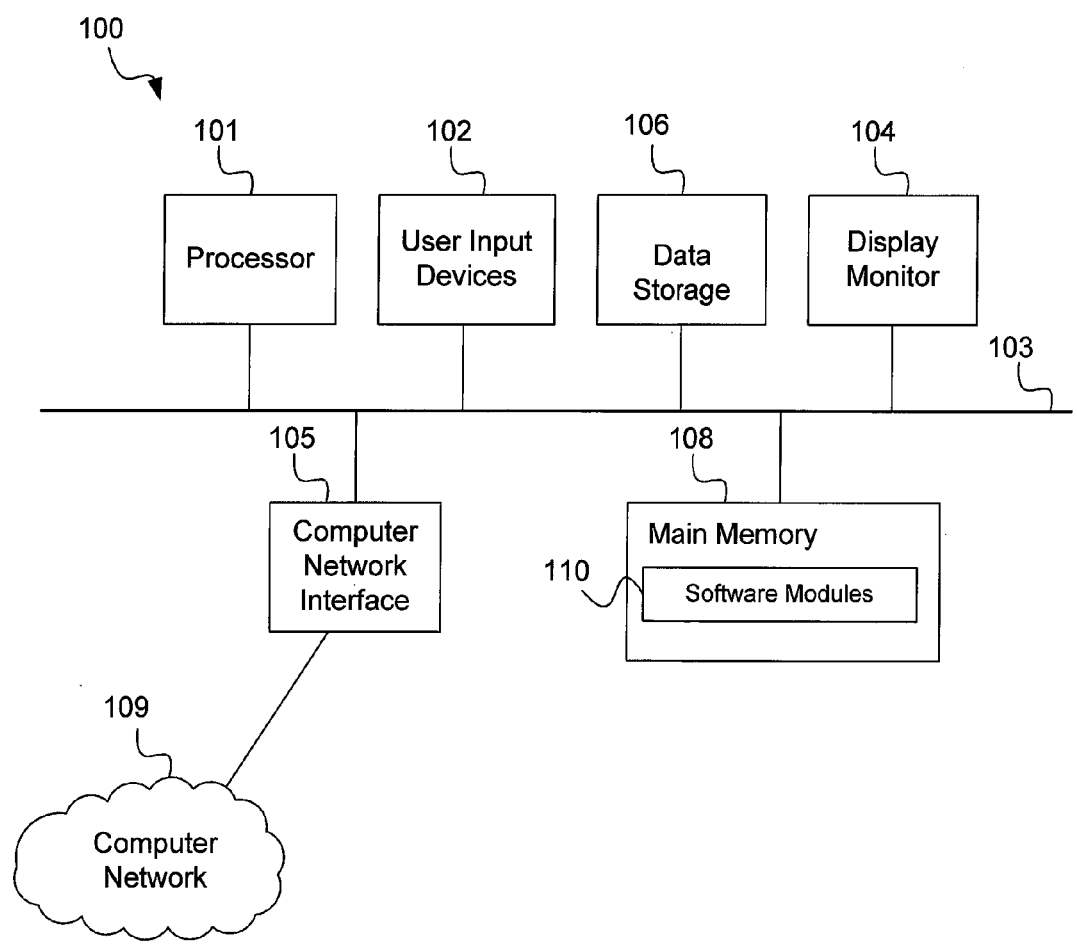
FIG. 1 shows a schematic diagram of a computer that may be employed in embodiments of the present invention.

Referring now to FIG. 1, there is shown a schematic diagram of a computer 100 that may be employed in embodiments of the present invention. The computer 100 may be employed as any of the computing devices discussed below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available in other computer-readable medium including optical disk, flash drive, and other memory devices.

Figure 2:
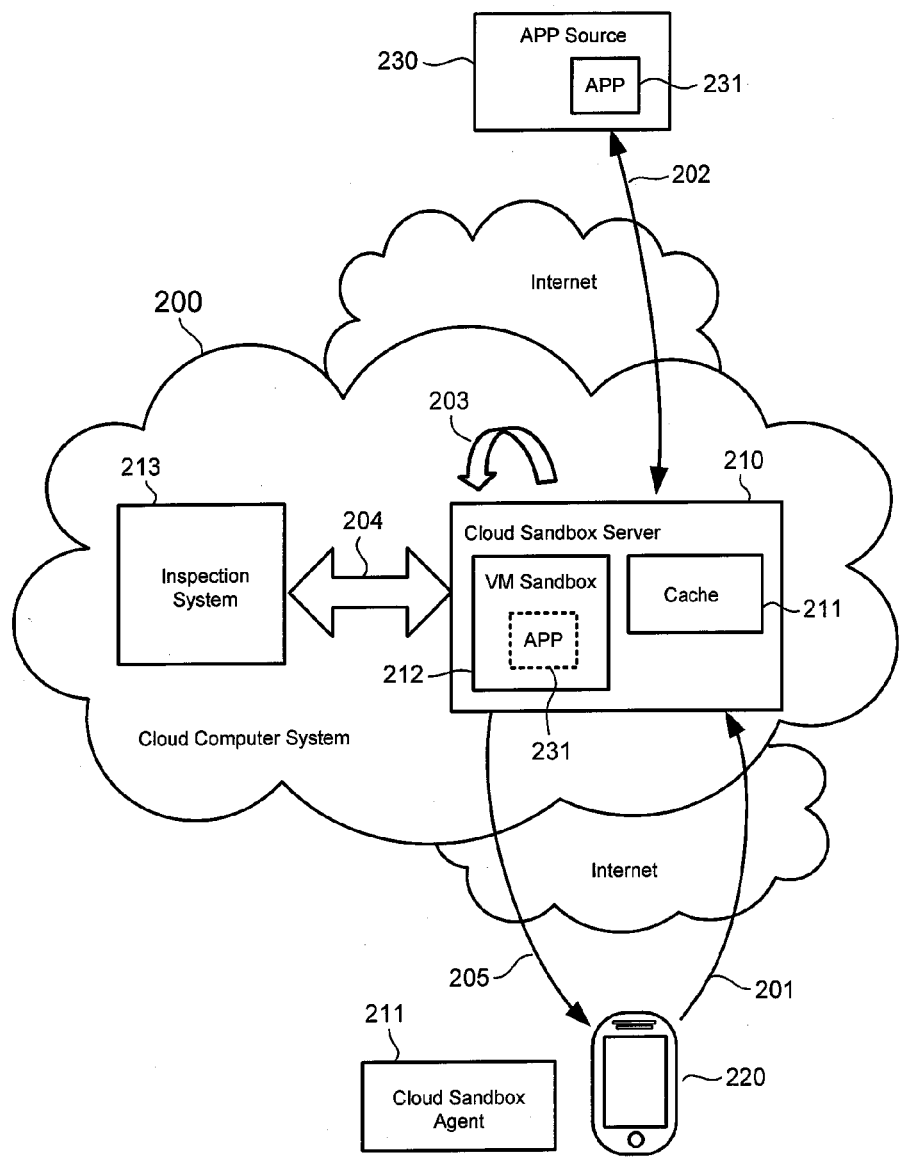
FIG. 2 shows a flow diagram of a system for inspecting a mobile application for malicious content in an in-the-cloud sandbox in accordance with an embodiment of the present invention.

FIG. 2 shows a flow diagram of a system for inspecting a mobile application for malicious content in an in-the-cloud sandbox in accordance with an embodiment of the present invention. The system of FIG. 2 includes a mobile device, a cloud computer system, and a mobile application source.

In the example of FIG. 2, a cloud computer system 200 includes an inspection system 213 and a cloud sandbox server 210. The cloud computer system 200 may comprise a single server computer or a plurality of server computers communicating over a computer network, such as the Internet. For example, the functionality of the inspection system 213 and the cloud sandbox server 210 may be implemented on a single computer or distributed among a plurality of computers. The cloud computer system 200 may communicate with mobile devices, server computers hosting mobile application sources, and other computing devices over the Internet.

In the example of FIG. 2, the cloud sandbox server 210 comprises computer-readable program code that provides a virtual machine sandbox 212. The virtual machine sandbox 212 provides a simulated computing environment where untrusted mobile applications may be run for inspection, while isolating the rest of the cloud computer system 200 from the untrusted mobile application. A mobile application is untrusted when it is not known if the mobile application is free of malicious content, i.e., safe. Although using a sandbox allows for effective detection of malicious content, a sandbox is computing intensive and is thus not feasible for low resource devices, such as smart phones and other mobile devices running mobile operating systems. In embodiments of the present invention, the sandbox is provided as an in-the-cloud service in that the sandbox is in a computer somewhere on the Internet rather than on the mobile device itself.

As its name implies, the virtual machine sandbox 212 is implemented in a virtual machine in one embodiment. Generally speaking, a virtual machine is a software implementation of a physical machine, i.e., a computer, and executes computer-readable program code just like the physical machine. In the example of FIG. 2, the sandbox 212 is implemented as a virtual machine that simulates a hardware environment of a mobile device, and may be running its own mobile operating system separate from the operating system employed by the cloud computer system 200. For example, the virtual machine sandbox 212 may comprise a virtual machine running the ANDROID mobile operating system.

The inspection system 213 may comprise computer-readable program code configured to inspect an untrusted mobile application for malicious content, such as malicious codes. Examples of malicious codes include computer viruses, spyware, keyboard loggers, etc. The inspection system 213 may inspect the untrusted mobile application while the untrusted mobile application is executing in the virtual machine sandbox 212. In one embodiment, the inspection system 213 is configured to monitor the network connections of the untrusted mobile application. For example, the inspection system 213 may check outgoing network connections of the untrusted mobile application to detect known malicious network information data, such as uniform resource locator (URL), internet protocol (IP) address, and/or domain name of known malicious network locations, including malicious server computers. The inspection system 213 may also be configured to monitor the behavior of the untrusted mobile application to detect whether the untrusted mobile application is trying to access the root system or change the system configuration setting (e.g., network setting, Bluetooth setting, location information) of the virtual machine of the sandbox 212. The inspection system 213 may also perform other methods for detecting malicious contents, such as using backend services, without detracting from the merits of the present invention.

The result of inspecting a mobile application for malicious content may be noted as an entry in a cache 211 along with an identifier, such as a hash value, of the mobile application. More specifically, the cache 211 may indicate whether or not a mobile application includes malicious content. The cache 211 may also indicate whether the mobile application has an "unknown" status in that it cannot be determined whether or not the mobile application includes malicious content. When a request to inspect a mobile application is received by the cloud sandbox server 210, the cloud sandbox server 210 may first consult the cache 211 to determine if the mobile application has an entry in the cache 211. If the mobile application has an entry in the cache 211, the cloud sandbox server 210 may simply provide the result of the inspection as indicated in the cache 211 to the requesting mobile device. Otherwise, if the mobile application does not have an entry in the cache 211, the cloud sandbox server 210 may initiate inspection of the mobile application. Entries in the cache 211 indicating whether or not particular mobile applications include malicious content may also be from inspections performed by backend computers separate from the cloud computer system 200, for example.

In the example of FIG. 2, a mobile device may include a cloud sandbox agent 211. The cloud sandbox agent 211 may comprise computer-readable program code for communicating with the cloud sandbox server 210. In one embodiment, the cloud sandbox agent 211 is configured to send a mobile application inspection request to the cloud sandbox server 210. The mobile application inspection request may include the name, version, vendor, storage location, and/or other identifying information of the mobile application. The mobile application inspection request may also indicate how the user wants to receive the result of the inspection. For example, the mobile application request may indicate to the cloud sandbox server 210 to send the result of the inspection to the cloud sandbox agent 211, to an e-mail address, by smart message service (SMS), or other means of receiving information. The identifying information of the mobile application and setting on how the user wants to receive the result of the inspection may be entered by the user into the user interface of the cloud sandbox agent 211.

Inspection of a mobile application for malicious content may begin when a mobile device in the form of a smart phone 220 sends a mobile application inspection request to the cloud sandbox server 210 over a computer network that includes the Internet (arrow 201). The smart phone 220 may be running the ANDROID mobile operating system, for example. The smart phone 220 may communicate with the cloud computer system 200 over a communication path that includes a telephone network (e.g., cellular network) that provides a connection to the Internet, for example. In the example of FIG. 2, the request is to inspect a mobile application, also labeled as an "APP", 231 available from a mobile application source 230. The mobile application source 230 may be a marketplace (also referred to as an "app store") for mobile applications hosted by a computer system. The mobile application source 230 may be the ANDROID MARKET app store, for example.

The mobile application 231 may comprise computer-readable program code that runs on a smart phone or tablet with a mobile operating system. The mobile application 231 is untrusted in that it is not known to the user of the smart phone 220 whether or not the mobile application 231 is safe to run on the smart phone 220. For example, it is not known whether or not the mobile application 231 comprises a computer virus or some other form of malicious code.

The cloud sandbox server 210 receives the mobile application inspection request from the cloud sandbox agent 211 running on the smart phone 220 (arrow 201). The mobile application inspection request includes identifying information of the mobile application 231. Using the identifying information of the mobile application 231, the cloud sandbox server 210 consults the cache 211 to check if the mobile application 231 has been previously inspected for malicious content. If so, the cloud sandbox server 210 would simply provide the result of the previous inspection to the smart phone 220. In this example, the mobile application 231 has no corresponding entry in the cache 211. Accordingly, the cloud sandbox server 210 uses the identifying information of the mobile application 231 to locate the mobile application 231 in the mobile application source 230, and downloads the mobile application 231 from the mobile application source 230 (arrow 202).

It is to be noted that the mobile application 231 may be free (i.e., costs nothing) as is the case for a lot of mobile applications for smart phones. In cases where the mobile application 231 is a paid application, the mobile application 231 may be optionally returned for a refund after evaluation to save cost.

The cloud sandbox server 210 installs and executes the mobile application 231 in the virtual machine sandbox 212 (arrow 203). The cloud sandbox server 210 starts the inspection system 213, which begins inspection of the mobile application 231 for malicious content (arrow 204). To determine whether or not the mobile application 231 includes malicious content, the inspection system 213 may observe the network connections and behavior of the mobile application 231 while the mobile application 231 executes in the virtual machine sandbox 212. Being in a sandbox, the cloud computer system 200 is isolated, and is thus safe, for possible malicious actions of the mobile application 231. The cloud sandbox server 210 receives the result of the inspection from the inspection system 213, stores the result of the inspection in the cache 211, and provides the result of the inspection to the user (arrow 205). For example, the cloud sandbox server 210 may forward the result of the inspection to the cloud sandbox agent 211, to an e-mail address, by SMS to the smart phone 220, and/or other ways depending on a setting of the cloud sandbox agent 211.

Figure 3:
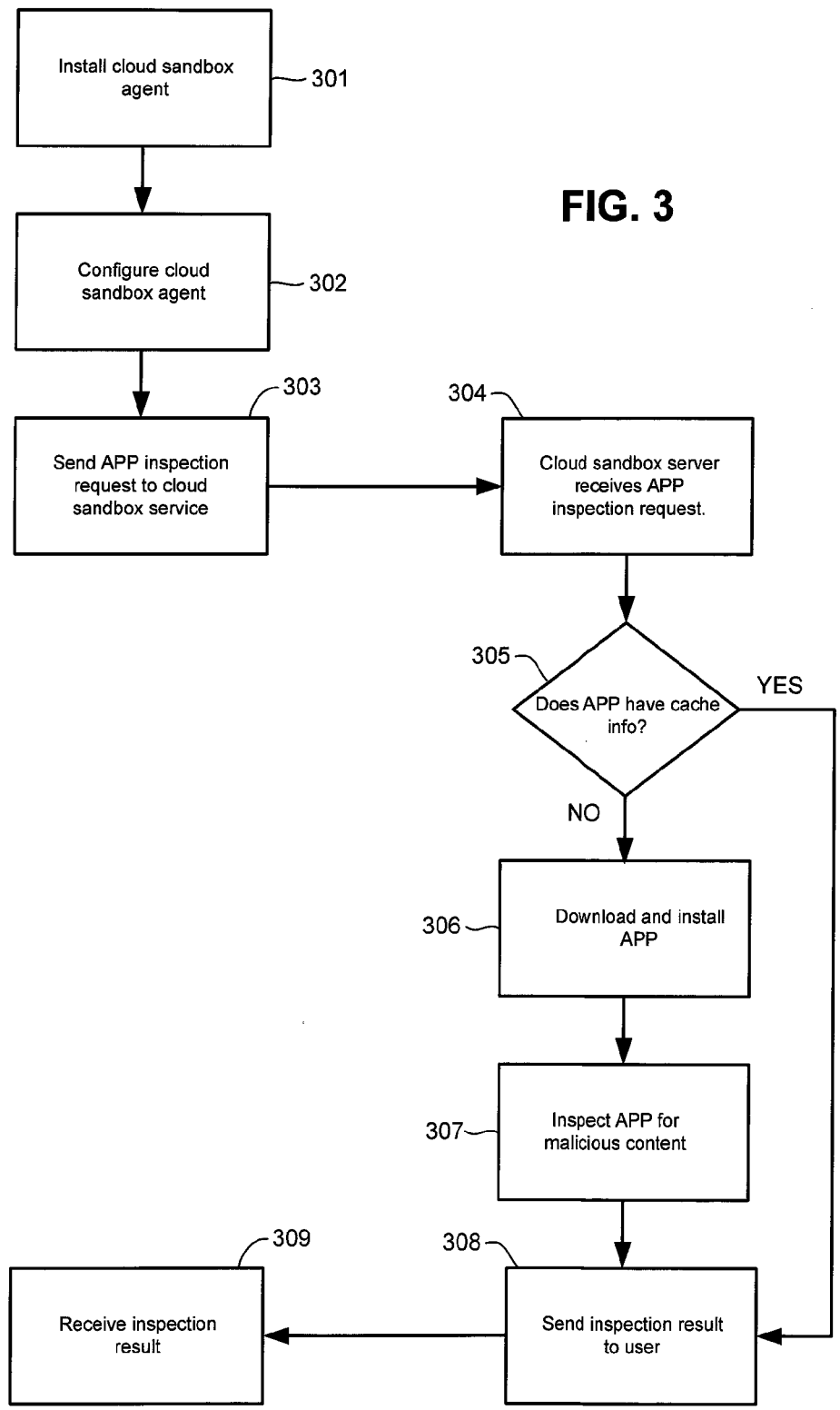
FIG. 3 shows a flow diagram of a method of inspecting a mobile application for malicious content in an in-the-cloud sandbox in accordance with an embodiment of the present invention.

FIG. 3 shows a flow diagram of a method of inspecting a mobile application for malicious content in an in-the-cloud sandbox in accordance with an embodiment of the present invention. The method of FIG. 3 is explained using the components shown in FIG. 2 for illustration purposes only. The steps 301-303 and 309 may be performed by a mobile device, while the steps 304-308 may be performed by a cloud computer system.

In the method of FIG. 3, a cloud sandbox agent 211 is installed in a mobile device in the form of a smart phone 220, which may be running the ANDROID mobile operating system (step 301). As can be appreciated, the mobile device may also be another low resource computing device running a mobile operating system, such as an ANDROID tablet, an APPLE iPAD tablet, an APPLE iPHONE smart phone, and the like. The cloud sandbox agent 211 is then configured (step 302), such as for the way the result of the inspection is to be delivered to the user. In one embodiment, the cloud sandbox agent 211 may be configured to inform the cloud sandbox server 210 to deliver the result of the inspection by SMS, e-mail, pop-up message on the smart phone 220, etc. The cloud sandbox agent 211 may include it settings in the mobile application inspection request sent by the cloud sandbox agent 211 to the cloud sandbox server 210.

The cloud sandbox agent 211 sends a request to the cloud sandbox server 210 to inspect a mobile application 231 for malicious content (step 303). The request may include the settings of the cloud sandbox agent 211 and identifying information of the mobile application 231. The cloud sandbox server 210 receives the mobile application inspection request (step 304), and consults the cache 211 for a result of inspection of the mobile application 231 for malicious content (step 305). If the cache 211 has a result of inspection of the mobile application 231, the cloud sandbox server 210 simply sends the result of the inspection to the user without initiating another inspection of the mobile application 231 for malicious content (step 305 to step 308).

If the cache 211 has no result of inspection of the mobile application 231 for malicious content, the cloud sandbox server 210 downloads the mobile application 231 from the mobile application source 230, and installs and executes the mobile application 231 in the virtual machine sandbox 212 (step 305 to 306). The inspection system 213 inspects the mobile application 231 for malicious content (step 307) by, for example, monitoring the behavior of the mobile application 231 while the mobile application 231 executes in the virtual machine sandbox 212. The cloud sandbox server 210 receives the result of the inspection from the inspection system 213 and forwards the result of the inspection to the user (step 308). The user receives the result of the inspection (step 309) in accordance with the setting of the cloud sandbox agent 211. For example, the user may receive the result of the inspection of the mobile application 231 for malicious content by e-mail, pop-up message, or smart messaging service in the smart phone 220.

Methods and apparatus for inspecting mobile applications for malicious content in an in-the-cloud sandbox have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of inspecting mobile applications for malicious content, the method comprising:
    receiving a request from a mobile device running a mobile operating system to inspect a particular mobile application for malicious content;
    in response to receiving the request, receiving the particular mobile application from a mobile application source, installing the particular mobile application in a virtual machine sandbox running in a cloud computer system, and inspecting the particular mobile application for malicious content while the particular mobile application is executing in the virtual machine sandbox; and
    sending a result of inspecting the particular mobile application for malicious content to the mobile device.

2. The method of claim 1 wherein the mobile device comprises a smart phone running the mobile operating system.

3. The method of claim 1 wherein the mobile device comprises a tablet running the mobile operating system.

4. The method of claim 1 wherein the result of inspecting the particular mobile application for malicious content is sent to the mobile device in accordance with a setting of the cloud sandbox agent running on the mobile device.

5. The method of claim 4 wherein the setting of the cloud sandbox agent indicates sending the result of inspecting the particular mobile application for malicious content by e-mail.

6. The method of claim 1 wherein the particular mobile application is inspected for computer viruses.

7. The method of claim 1 further comprising:
consulting a cache for a result of a previous inspection of the particular mobile application for malicious content prior to installing the particular mobile application in the virtual machine sandbox.

8. The method of claim 1 wherein the request from the mobile device includes a setting on how the result of inspecting the particular mobile application for malicious content will be received by the mobile device.

9. A system for inspecting mobile applications for malicious content, the system comprising:
a mobile device configured to send a request to inspect a particular mobile application for malicious content, the mobile device running a mobile operating system;
a mobile application source storing the particular mobile application; and
the cloud computer system comprising one or more computers configured to receive from the mobile device the request to inspect the particular mobile application for malicious content, the cloud computer system being configured in response to the request to download the particular mobile application from the mobile application source over a computer network, to install the particular mobile application in a virtual machine sandbox, to inspect the particular mobile application for malicious content while the particular mobile application is executing in the virtual machine sandbox, and to forward to the mobile device a result of the inspection of the particular mobile application for malicious content.

10. The system of claim 9 wherein the mobile device comprises a smart phone running the mobile operating system.

11. The system of claim 9 wherein the mobile device comprises a tablet running the mobile operating system.

12. The system of claim 9 wherein the cloud computer system forwards the result of the inspection of the particular mobile application for malicious content in accordance with a setting on a cloud sandbox agent running on the mobile device.

13. The system of claim 9 wherein the setting on the cloud sandbox agent running on the mobile device indicates sending the result of the inspection of the particular mobile application for malicious content to the mobile device by e-mail.

14. The system of claim 9 wherein the setting on the cloud sandbox agent running on the mobile device indicates sending the result of the inspection of the particular mobile application for malicious content to the mobile device by smart messaging service.

15. The system of claim 9 wherein the cloud computer system is further configured to consult a cache to determine if the particular mobile application has been previously inspected for malicious content.

16. A method of inspecting mobile applications for malicious content, the method comprising:
a smart phone sending a request to inspect a particular mobile application for malicious content to a cloud computer system;
in response to receiving the request to inspect the particular mobile application for malicious content, the cloud computer system downloading the particular mobile application from a mobile application source over a computer network, installing the particular mobile application in a virtual machine sandbox, inspecting the particular mobile application for malicious content while the particular mobile application is executing in the virtual machine sandbox, and sending a result of inspecting the particular mobile application for malicious content to the smart phone.

17. The method of claim 16 wherein the cloud computer system sends the result of inspecting the particular mobile application for malicious content by e-mail.

18. The method of claim 16 wherein the cloud computer system sends the result of inspecting the particular mobile application for malicious content in accordance with a setting of a cloud sandbox agent running on the smart phone.

19. The method of claim 16 wherein the particular mobile application is inspected for computer viruses.

20. The method of claim 16 further comprising:
prior to installing the particular mobile application in the virtual machine sandbox, the cloud computer system consulting a cache for a result of a previous inspection of the particular mobile application for malicious content.

* * * * *